United States Patent
Lee et al.

(10) Patent No.: US 7,761,777 B2
(45) Date of Patent: Jul. 20, 2010

(54) SOFT DECISION DEMAPPING METHOD SUITABLE FOR HIGHER-ORDER MODULATION FOR ITERATIVE DECODER AND ERROR CORRECTION APPARATUS USING THE SAME

(75) Inventors: In-Ki Lee, Busan (KR); Dae-Ig Chang, Daejon (KR); Deock-Gil Oh, Daejon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 982 days.

(21) Appl. No.: 11/518,247

(22) Filed: Sep. 11, 2006

(65) Prior Publication Data
US 2007/0133718 A1    Jun. 14, 2007

(30) Foreign Application Priority Data
Dec. 9, 2005    (KR) ............... 10-2005-0121114

(51) Int. Cl.
*H03M 13/00* (2006.01)
(52) U.S. Cl. ........................................ 714/780
(58) Field of Classification Search ............... 714/780, 714/794; 375/341
See application file for complete search history.

(56) References Cited

U.S. PATENT DOCUMENTS
7,308,047 B2 * 12/2007 Sadowsky ............... 375/324

FOREIGN PATENT DOCUMENTS

| JP | 09-181785 | 7/1997 |
|---|---|---|
| JP | 0153966 | 7/1998 |
| JP | 11-215200 | 8/1999 |
| JP | 2003-324356 | 11/2003 |
| WO | WO 01/67617 | 9/2001 |
| WO | WO 03/007529 | 1/2003 |

* cited by examiner

*Primary Examiner*—Shelly A Chase
(74) *Attorney, Agent, or Firm*—Lowe Hauptman Ham & Berner LLP (57) ABSTRACT

A soft decision demapping method includes defining distance values between a received signal and coordinates of constellation dots, obtaining a difference between a maximum value of distance values when a first bit is 0 and a maximum value of distance values when the first bit is 1, during a soft decision of the first bit of N-bit received signal symbol, acquiring a difference between a maximum value of distance values when a second bit is 0 and a maximum value of distance values when the second bit is 1, during a soft decision of the second bit of the N-bit received signal symbol, and deriving a difference between a maximum value of distance values when an Nth bit is 0 and a maximum value of distance values when the Nth bit is 1, during a soft decision of the Nth bit of the N-bit received signal symbol.

9 Claims, 8 Drawing Sheets

SOFT DECISION DEMAPPING METHOD SUITABLE FOR HIGHER-ORDER MODULATION FOR ITERATIVE DECODER AND ERROR CORRECTION APPARATUS USING THE SAME

FIELD OF THE INVENTION

The present invention relates to a digital wireless communication system, and more particularly, to a soft decision demapping method suitable for higher-order modulation for an iterative decoder and an error correction apparatus using the same, which are capable of preventing performance deterioration of repetition codes using an efficient technique.

DESCRIPTION OF RELATED ART

It is known that Shannon limit refers to a basic limit to a maximum transmission rate of information that can be sent with reliability over communication channel.

In order to correct errors in a wireless communication system, generally, there has been used a channel coding method.

Especially, an iterative coding technique that approaches the Shannon limit has been applied to digital wireless communication systems in various ways.

But, in order to achieve the performance required by the iterative coding technique, Soft Input Soft Output (SISO), that is, a received signal should be soft-decided, rather than hard-decided. Therefore, there is essentially a need for a technique of soft-deciding received symbols as bits in systems of higher-order modulation.

For more information, in digital modulation, a signal is sent by changing any one or a combination of phase, amplitude, and frequency of a carrier wave to digital data of 0 or 1. A modulation method for corresponding codes to phase change and then sending a signal is called Phase Shift Keying (PSK).

A basic PSK, which sends a digital signal of two values, 1 and 0, to be sent by corresponding them to two phases, 0 and 1, is called Binary PSK (BPSK).

Differently from the BPSK, a modulation method, which collects two bits of digital signal of 0 and 1, corresponds them to four phases of carrier wave, and then sends it, is called Quadrature PSK (QPSK). In other words, the signal is sent by corresponding (0, 0) to 0 phase, (0, 1) to $\pi/2$ phase, (1, 0) to $\pi$ phase, and (1, 1) to $3\pi/2$ phase. The BPSK is also named as 2 PSK, and the QPSK as 4 PSK. The QPSK modulation wave enables information to be sent two times over a same frequency band, compared to the BPSK modulation wave; and thus is widely used in voice signal transmission of satellite broadcasting or satellite communication fields.

On the other hand, there are 8 PSK capable of sending information three times and 16 PSK capable of sending information four times, and 32 PSK capable of sending information five times, over a same frequency band, compared to the BPSK.

In addition, a modulation method that carries information on both phase and amplitude of carrier wave and then sends it is called Amplitude PSK (APSK).

Figure 1:
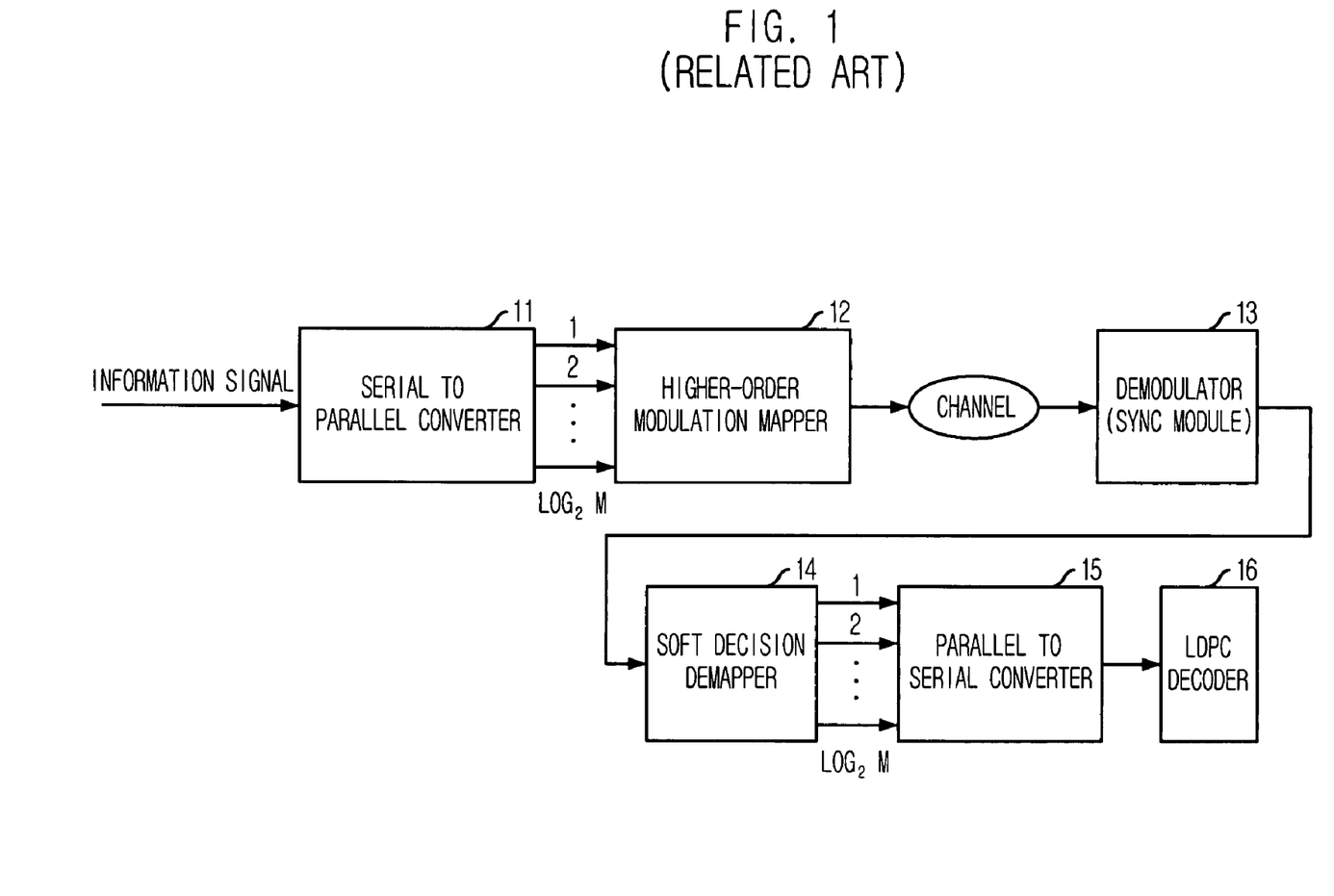
FIG. 1 is a block diagram showing a configuration of a general digital wireless communication system.

Hereinafter, a description will be given on a general digital wireless communication system with reference to FIG. 1.

First, coded information bits are applied to a higher-order modulation mapper 12 in units of $\log_2 M$ bits in parallel via a serial to parallel converter 11 and then outputted as one symbol. This symbol is synchronized at a demodulator (sync module) 13 of a receiving end via a channel and then provided to a Low Density Parity Check (LDPC) decoder 16 as channel code (LDPC as repetition code) via a demapper 14 and a parallel to serial converter 15.

At the demapper 14, the received symbol should be divided again wherein it should become a soft decision value if the channel code is the repetition code.

In the conventional wireless communication system, Log Likelihood Ratio (LLR) method has been used as the soft decision technique. However, if this method is used, there are problems in terms of a size of hardware and an amount of power consumption owing to complicated operation process. To overcome these problems, soft decision techniques of low complexity have been proposed. However, those techniques have a drawback that deterioration exists in Bit Error Rate (BER) performance compared to the LLR method. Details thereof are as follows.

Figure 2:
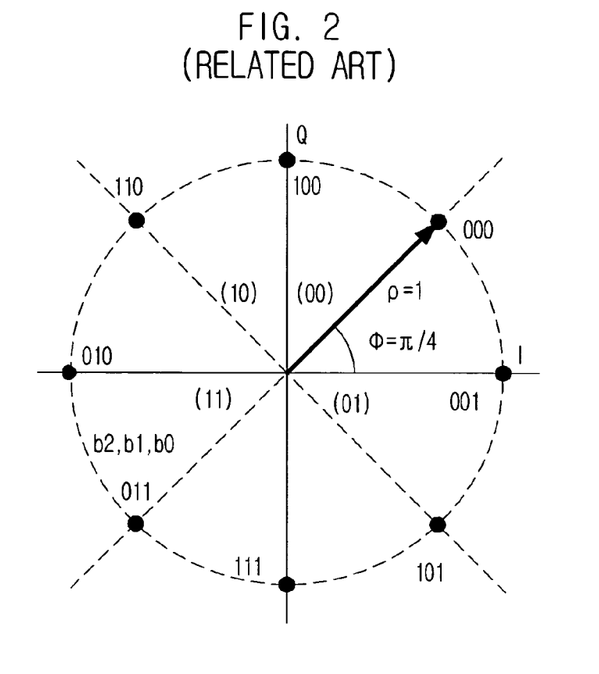
FIG. 2 is a constellation view of an 8 PSK digital modulation method.

First of all, there will be described a constellation view of 8 PSK referring to FIG. 2, out of various digital modulation methods. At this time, the soft decision method using the general LLR is defined as:

$$0:000:b2b1b0:s_0 = \cos(\pi/4) + j*\sin(\pi/4)$$
$$1:001:b2b1b0:s_1 = \cos(0) + j*\sin(0)$$
$$2:010:b2b1b0:s_2 = \cos(\pi) + j*\sin(\pi)$$
$$3:011:b2b1b0:s_3 = -\cos(\pi/4) - j*\sin(\pi/4)$$
$$4:100:b2b1b0:s_4 = \cos(\pi/2) + j*\sin(\pi/2)$$
$$5:101:b2b1b0:s_5 = \cos(\pi/4) - j*\sin(\pi/4)$$
$$6:110:b2b1b0:s_6 = -\cos(\pi/4) + j*\sin(\pi/4)$$
$$7:111:b2b1b0:s_7 = \cos(\pi/2) - j*\sin(\pi/2)$$
$$LLR[b2] = \log\frac{P_0 + P_1 + P_2 + P_3}{P_4 + P_5 + P_6 + P_7}$$
$$LLR[b1] = \log\frac{P_0 + P_1 + P_4 + P_5}{P_2 + P_3 + P_6 + P_7}$$
$$LLR[b0] = \log\frac{P_0 + P_2 + P_4 + P_6}{P_1 + P_3 + P_5 + P_7}$$
$$\text{where, } P_i = \frac{1}{\sqrt{2\pi\sigma^2}}e^{\frac{|r-s_i|^2}{2\sigma^2}} \quad i = 0, \ldots, 7 \qquad \text{Eq. (1)}$$

wherein "$S_i$" is coordinates of constellation dots, "r" is a received signal, "$\sigma^2$" is a variance in Additive White Gaussian Noise (AWGN) channel environment, "b0, b1 and b2" are bits upon symbol mapping at 8 PSK constellation dots of FIG. 2, and "LLR[b0], LLR[b1] and LLR[b2]" are outputs of soft decision method as probability values of each of b0, b1 and b2 bits.

As can be seen from Eq. (1) above, operation steps of exponent function and log function are needed in the above equation to compute a last output LLR. This operation may become a factor that highly increases an amount of operation of hardware. As schemes to solve this, there are proposed a scheme of using Euclidian distance as defined in Eq. (2) below and a scheme of using intervals of phase as given in Eq. (3) below.

First, the scheme of using Euclidian distance is represented by:

$$D_i = \sqrt{(s_i - r)} \; i = 0, 1, \ldots, 7$$
$$LLR(b2) = \min(D_0, D_1, D_2, D_5) - \min(D_4, D_5, D_6, D_7)$$
$$LLR(b1) = \min(D_0, D_1, D_4, D_5) - \min(D_2, D_3, D_6, D_7)$$
$$LLR(b0) = \min(D_0, D_2, D_4, D_n) - \min(D_1, D_3, D_5, D_7) \qquad \text{Eq. (2)}$$

Figure 3:
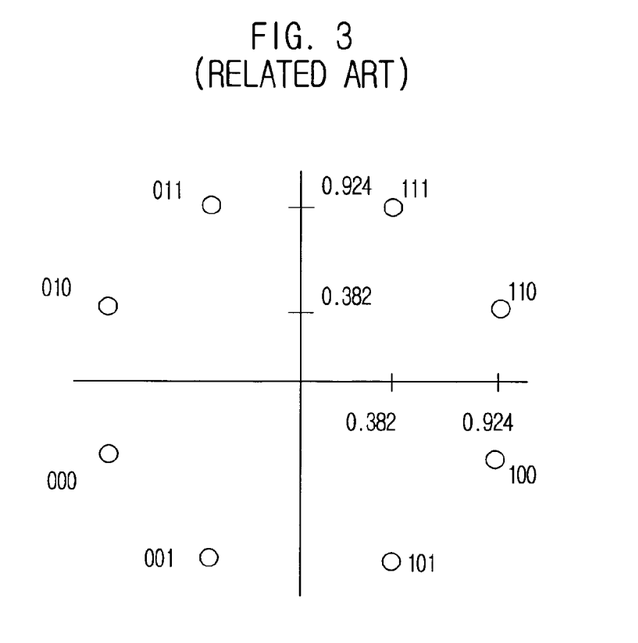
FIG. 3 is a constellation view of an 8 PSK in a way of using intervals of phase.

Meanwhile, the scheme of using the intervals of phase conducts the soft decision with Eq. (3) below after converting to constellation dots as provided in FIG. 3.

$$LLR(b2) = |r_x|$$
$$LLR(b1) = |r_y|$$
$$LLR(b0) = \begin{cases} r_y - r_x & r_x \geq 0, \ r_y \geq 0 \\ r_x + r_y & r_x < 0, \ r_y \geq 0 \\ r_x - r_y & r_x < 0, \ r_y < 0 \\ -(r_y - r_x) & r_x \geq 0, \ r_y \geq 0 \end{cases}$$
Eq. (3)

Figure 8:
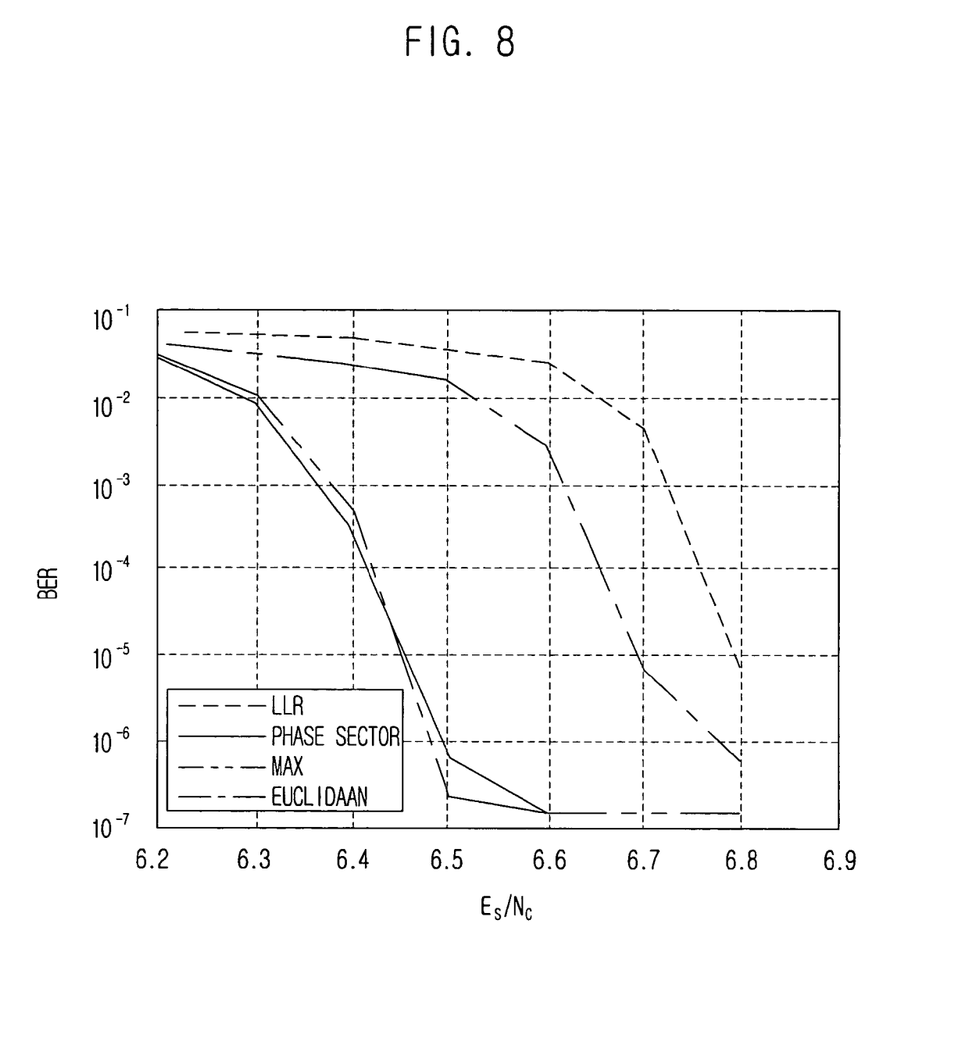
FIG. 8 is a graph showing BER performances when applying the 8 PSK modulation method in accordance with the present invention.

However, the above-described two conventional schemes have a shortcoming that a deterioration of performance is occurred, unlike a LLR method of the present invention, as indicted in a BER performance graph of FIG. 8. In addition, another problem of the two schemes is that there is a defect in terms of a size of hardware and an amount of power consumption due to the complex operation process as mentioned above.

SUMMARY OF THE INVENTION

It is, therefore, a primary object of the present invention to provide a soft decision demapping method suitable for a digital wireless communication system that requires performance that approaches Shannon limit and an error correction apparatus using the same. This can be accomplished by acquiring soft decision bits using a comparison operation allowing simple implementation in stead of avoiding complicated exponent and log operations through the use of a soft decision bit dispersion technique that decreases a burden on an amount of hardware operation and with no degradation of BER performance.

In accordance with one aspect of the present invention, there is provided a soft decision demapping method suitable for higher-order modulation for an iterative decoder in a $2^N$ phase modulation system, N being a positive integer, including the steps of: defining distance values Pi between a received signal r and coordinates Si of constellation dots; obtaining a difference between a maximum value of distance values Pi when a first bit or Most Significant Bit (MSB) is 0 and a maximum value of distance values Pi when the first bit is 1, during a soft decision of the first bit of N-bit received signal symbol; acquiring a difference between a maximum value of distance values Pi when a second bit is 0 and a maximum value of distance values Pi when the second bit is 1, during a soft decision of the second bit of the N-bit received signal symbol; and deriving a difference between a maximum value of distance values Pi when an Nth bit is 0 and a maximum value of distance values Pi when the Nth bit is 1, during a soft decision of the Nth bit of the N-bit received signal symbol.

In accordance with another aspect of the present invention, there is provided an error correction apparatus for correcting errors of values obtained by soft-deciding a received symbol as bits by the soft decision demapping method as recited in any one of claims 1 to 4, wherein if a channel code is a repetition code, the apparatus receives a value, from a soft decision demapper, in which bits by order of higher-order modulation are divided as soft decision, and corrects errors based on an adaptation demodulation signal and modulation method information to have performance that approaches Shannon limit.

The soft decision demapping method (demapper) of the present invention has no performance degradation in soft-deciding a received signal while having low complexity suitable for various higher-order modulations, in demapping the received signal with repetition codes inputted.

For this, the soft decision demapping method (demapper) of the present invention divides bits by order of higher-order modulation as soft decision value with channel codes (repetition codes) using received symbol value, in higher-order modulation method of digital wireless communication system. At this time, the soft decision value of the received signal can be obtained, without any performance deterioration, by using a simple comparison operation, excluding complex exponent function and log function operations.

In accordance with the present invention, it is possible to apply the present invention to repetition codes such as LDPC, Turbo, Turbo Product Code (TPC), etc. using higher-order modulations. In other words, the present invention can get to the performance that approaches Shannon limit by combining with the repetition codes of digital satellite broadcasting systems by means of efficiently providing received signal mapped relying on the higher-order modulations as soft decision value.

The other objectives and advantages of the invention will be understood by the following description and will also be appreciated by the embodiments of the invention more clearly.

Further, the objectives and advantages of the invention will readily be seen that they can be realized by the means and its combination specified in the claims.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

The above-mentioned objectives, features, and advantages will be more apparent by the following detailed description associated with the accompanying drawings; and thus, the invention will be readily conceived by those skilled in the art to which the invention pertains. Further, in the following description, well-known arts will not be described in detail if it seems that they could obscure the invention in unnecessary detail. Hereinafter, a preferred embodiment of the present invention will be set forth in detail with reference to the accompanying drawings.

Figure 6:
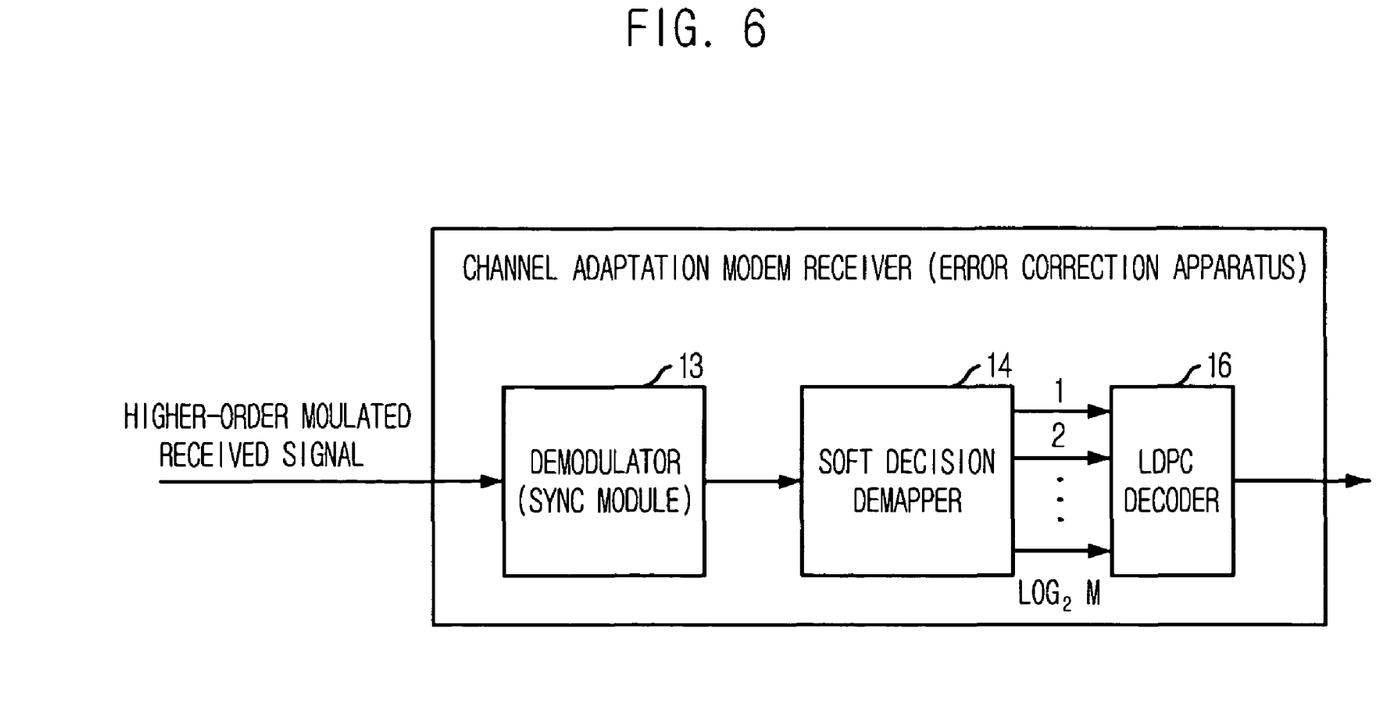
FIG. 6 is a block diagram illustrating a configuration of a channel adaptation modem receiver (error correction apparatus) to which a soft decision demapping method (soft decision demapper) in accordance with the present invention are applied.

FIG. 6 is a block diagram showing a configuration of a channel adaptation modem receiver (error correction apparatus) to which a soft decision demapping method (soft decision demapper) in accordance with the present invention are applied.

An LDPC code used as channel code in the next digital satellite broadcasting system (DVB-S2) is one of typical repetition codes, and therefore, this is based on SISO. For this, an LDPC decoder 16 needs a soft decision value of received signal as its input, wherein a performance thereof is changed depending on the soft decision method. Therefore, a soft decision demapper 14 is required to efficiently soft-decide the received signal at an input end of the LDPC decoder 16. Accordingly, the LDPC decoder 16 receives a soft decision value from the soft decision demapper 14 and thus can correct errors based on an adaptive demodulation signal and modulation method information.

In the soft decision demapper (soft decision demapping method) of the present invention, since it has a good performance through a comparison operation of simple implementation, no additional complicated exponent and log operations are needed.

The conventional LLR method, as shown in Eq. (1) above, involves the exponent operation in inducing $P_i$ with the mathematical operation between the received signal r and the coordinates $s_i$ of constellation dots. Next, it finally induces the LLR value through the log operation.

However, the soft decision demapper (soft decision demapping method) of the present invention can induce Eq. (1) above through Eq. (5) using the property of Eq. (4).

$$\log(e^a + e^b + e^c) = \log(e^a(1 + e^{b-a} + e^{c-a})) \cong \max(a, b, c) \quad \text{Eq. (4)}$$
if $a > b, a > c, e^{b-a} \cong 0, e^{c-a} \cong 0$
$\therefore \log(e^a(1 + e^{b-a} + e^{c-a})) \cong \log(e^a) \cong a$
$\therefore \log(e^a + e^b + e^c) \cong \max(a, b, c)$ -continued $$LLR[b2] = \log\frac{e^{P_0} + e^{P_1} + e^{P_2} + e^{P_3}}{e^{P_4} + e^{P_5} + e^{P_6} + e^{P_7}} \quad \text{Eq. (5)}$$
$= \log(e^{P_4} + e^{P_1} + e^{P_2} + e^{P_3}) -$
$\quad \log(e^{P_8} + e^{P_5} + e^{P_6} + e^{P_7})$
$\cong \{\max(P_0, P_1, P_2, P_3) - \max(P_4, P_5, P_6, P_7)\}$ $$LLR[b1] = \log\frac{e^{P_0} + e^{P_1} + e^{P_4} + e^{P_5}}{e^{P_2} + e^{P_3} + e^{P_6} + e^{P_7}}$$
$= \log(e^{P_0} + e^{P_1} + e^{P_4} + e^{P_5}) -$
$\quad \log(e^{P_2} + e^{P_3} + e^{P_6} + e^{P_7})$
$\cong \{\max(P_0, P_1, P_4, P_5) - \max(P_2, P_3, P_6, P_7)\}$ $$LLR[b0] = \log\frac{e^{P_0} + e^{P_2} + e^{P_4} + e^{P_6}}{e^{P_1} + e^{P_3} + e^{P_5} + e^{P_7}}$$
$= \log(e^{P_0} + e^{P_2} + e^{P_4} + e^{P_6}) -$
$\quad \log(e^{P_1} + e^{P_3} + e^{P_5} + e^{P_7})$
$\cong \{\max(P_0, P_2, P_4, P_6) - \max(P_1, P_3, P_5, P_7)\}$ where, $P_i = \frac{-\|r - s_i\|^2}{2\sigma^2} \quad i = 0, \ldots, 7$ wherein "r" is a received symbol, "$S_i$" is constellation dots (coordinates of constellation dots), and "$\sigma^2$" indicates a variance in an AWGN channel environment.

In other words, $P_i$ means distance values between the received signal r and the coordinates $S_i$ of constellation dots; and in case of 8 PSK, $P_0$ denotes "000", $P_1$ "001", $P_2$ "010", $P_3$ "011", $P_4$ "100", $P_5$ "101", $P_6$ "110", and $P_7$ "111".

Further, "b0, b1 and b2" indicate bits upon symbol mapping at 8 PSK constellation dots of FIG. 2, and "LLR[b0], LLR[b1] and LLR[b2]" are outputs of soft decision method as probability values of each of b0, b1 and b2 bits.

Therefore, in the 8 PSK, LLR[b2] means a soft decision value of a first bit or most significant bit, LLR[b1] is a soft decision value of a second bit, and LLR[b0] is a soft decision value of a third bit.

Accordingly, in case of soft-deciding a first bit of 3-bit received signal symbol (LLR[b2]), there is obtained a difference between a maximum value max ($P_0, P_1, P_2, P_3$) of distance values $P_i$ when the first bit is 0 and a maximum value max ($P_4, P_5, P_6, P_7$) of distance values when the first bit is 1.

Similarly, in case of soft-deciding a second bit of 3-bit received signal symbol (LLR[b1]), there is derived a difference between a maximum value max ($P_0, P_1, P_4, P_5$) of distance values $P_i$ when the second bit is 0 and a maximum value max ($P_2, P_3, P_6, P_7$) of distance values when the second bit is 1.

In a similar manner, in case of soft-deciding a third bit of 3-bit received signal symbol (LLR[b0]), there is acquired a difference between a maximum value max ($P_0, P_2, P_4, P_6$) of distance values $P_i$ when the third bit is 0 and a maximum value max ($P_1, P_3, P_5, P_7$) of distance values when the third bit is 1.

Figure 7:
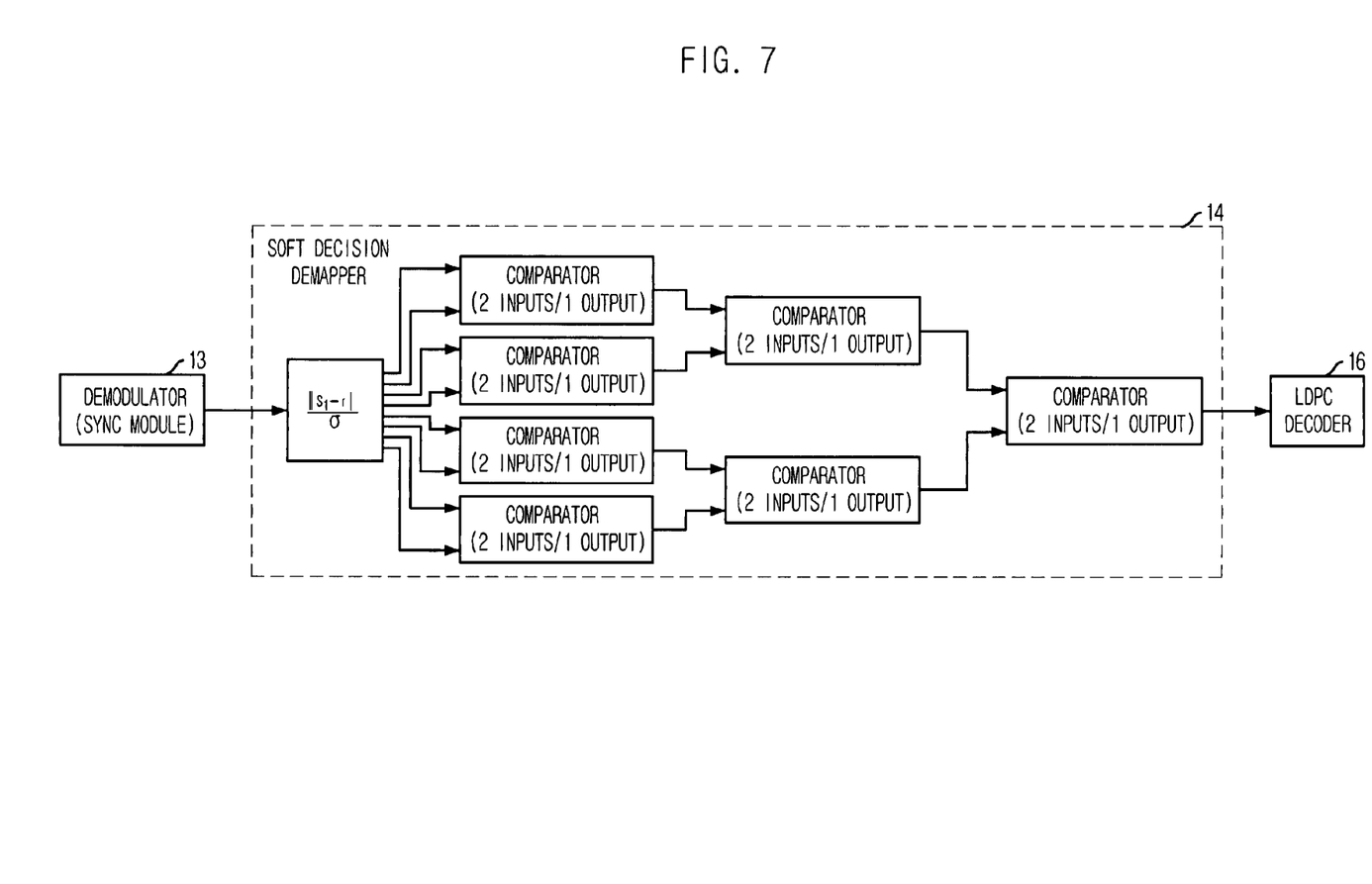
FIG. 7 illustrates a block diagram for describing a soft decision demapping method in accordance with an embodiment of the present invention.

Through such a process, the exponent operation and log operation can be omitted in Eq. (5) above, and its implementation can be possible with only comparison operator, thereby decreasing complexity in actual hardware implementation. Thus, in the 8 PSK, soft decision values can be provided through 7 comparators, each having 2 inputs/1 output, as illustrated in FIG. 7.

FIG. 8 is a graph showing a comparison of BER performances of the conventional two methods (Euclidian and phase sector) and the LLR of the present invention to which the 8 PSK modulation method is applied. At this time, the repetition code used is LDPC that is presented in the DVB-S2 standard, and a coding rate is ⅔.

As can be seen from FIG. 8, the LLR method of the present invention has no performance deterioration and is good in performance by about 0.3 dB, compared to the existing two methods.

Figure 4:
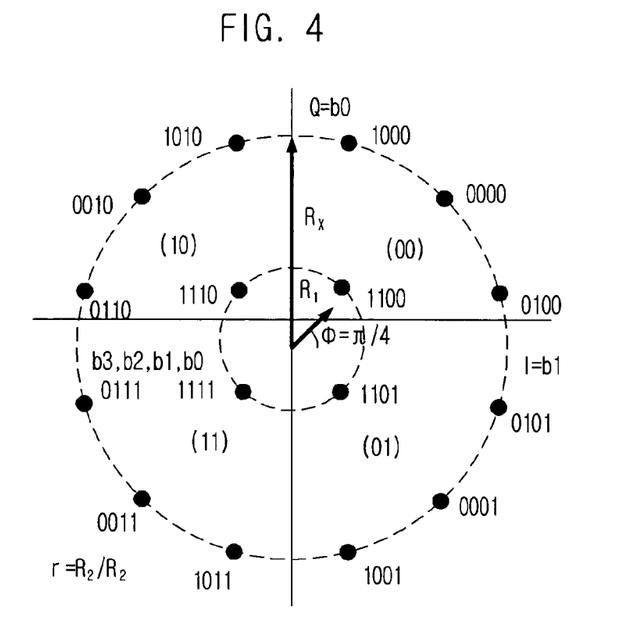
FIG. 4 is a constellation view of a 16 APSK digital modulation method.

On the other hand, 16 APSK constellation dots of FIG. 4 can be induced by Eq. (6) below using the property of Eq. (4) above.

$$LLR[b3] = \{\max(P_0, P_1, P_2, P_3, P_4, P_5, P_6, P_7) - \max(P_8, P_9, P_{10}, P_{11}, P_{12}, P_{13}, P_{14}, P_{15})\}$$
$$LLR[b2] = \{\max(P_0, P_1, P_2, P_3, P_8, P_9, P_{10}, P_{11}) - \max(P_4, P_5, P_6, P_7, P_{12}, P_{13}, P_{14}, P_{15})\}$$
$$LLR[b1] = \{\max(P_0, P_1, P_4, P_5, P_8, P_9, P_{12}, P_{13}) - \max(P_2, P_3, P_6, P_7, P_{10}, P_{11}, P_{14}, P_{15})\}$$
$$LLR[b0] = \{\max(P_0, P_2, P_4, P_6, P_8, P_{10}, P_{12}, P_{14}) - \max(P_1, P_3, P_5, P_7, P_9, P_{11}, P_{13}, P_{15})\}$$

$$\text{where, } P_i = \frac{-\|r - s_i\|^2}{2\sigma^2} \text{ where, } i = 0, \ldots, 15$$

Eq. (6)

wherein "r" is a received symbol, "$S_i$" is constellation dots (coordinates of constellation dots), and "$\sigma^2$" indicates a variance in an AWGN channel environment.

In other words, $P_i$ means distance values between the received signal r and the coordinates $S_i$ of constellation dots; and in case of 8 PSK, $P_0$ denotes "0000", $P_1$ "0001", $P_2$ "0010", $P_3$ "0011", $P_4$ "0100", $P_5$ "0101", $P_6$ "0110", $P_7$ "0111", $P_8$ "1000", $P_9$ "1001", $P_{10}$ "1010", $P_{11}$ "1011", $P_{12}$ "1100", $P_{13}$ "1101", $P_{14}$ "1110" and $P_{15}$ "1111".

Further, "b0, b1, b2 and b3" indicate bits upon symbol mapping at 16 APSK constellation dots of FIG. 4, and "LLR[b0], LLR[b1], LLR[b2] and LLR[b3]" are outputs of soft decision method as probability values of each of b0, b1, b2 and b3 bits.

Therefore, in the 16 APSK, LLR[b3] is a soft decision value of a first bit, LLR[b2] is a soft decision value of a second bit, LLR[b1] is a soft decision value of a third bit, and LLR[b0] is a soft decision value of a fourth bit.

Accordingly, in case of soft-deciding a first bit of 4-bit received signal symbol (LLR[b3]), there is obtained a difference between a maximum value max ($P_0$, $P_1$, $P_2$, $P_3$, $P_4$, $P_5$, $P_6$, $P_7$) of distance values $P_i$ when the first bit is 0 and a maximum value max ($P_8$, $P_9$, $P_{10}$, $P_{11}$, $P_{12}$, $P_{13}$, $P_{14}$, $P_{15}$) of distance values when the first bit is 1.

Similarly, in case of soft-deciding a second bit of 4-bit received symbol (LLR[b2]), there is derived a difference between a maximum value max ($P_0$, $P_1$, $P_2$, $P_3$, $P_8$, $P_9$, $P_{10}$, $P_{11}$) of distance values Pi when the second bit is 0 and a maximum value max ($P_4$, $P_5$, $P_6$, $P_7$, $P_{12}$, $P_{13}$, $P_{14}$, $P_{15}$) of distance values when the second bit is 1.

In a similar manner, in case of soft-deciding a third bit of 4-bit received symbol (LLR[b1]), there is acquired a difference between a maximum value max ($P_0$, $P_1$, $P_4$, $P_5$, $P_8$, $P_9$, $P_{12}$, $P_{13}$) of distance values $P_i$ when the third bit is 0 and a maximum value max ($P_2$, $P_3$, $P_6$, $P_7$, $P_{10}$ $P_{11}$, $P_{14}$, $P_{15}$) of distance values when the third bit is 1.

Analogously, in case of soft-deciding a fourth bit of 4-bit received symbol (LLR[b0]), there is obtained a difference between a maximum value max ($P_0$, $P_2$, $P_4$, $P_6$, $P_8$, $P_{10}$, $P_{12}$, $P_{14}$) of distance values $P_i$ when the fourth bit is 0 and a maximum value max ($P_1$, $P_3$, $P_5$, $P_7$, $P_9$, $P_{11}$, $P_{13}$, $P_{15}$) of distance values when the fourth bit is 1.

By doing so, the exponent operation and log operation can be omitted in Eq. (6) above, and its implementation can be possible with only comparison operator, thereby decreasing complexity in actual hardware implementation. Thus, in the 16 APSK, soft decision values can be provided through 15 comparators, each having 2 inputs/1 output.

Figure 5:
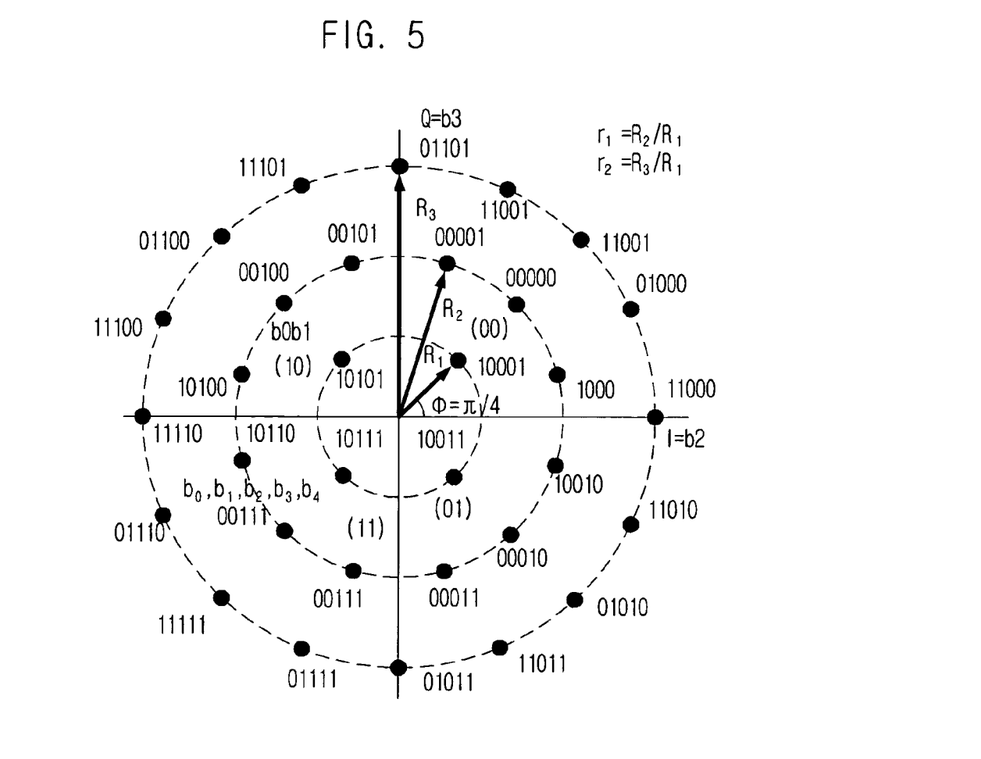
FIG. 5 is a constellation view of a 32 APSK digital modulation method.

Meanwhile, 32 APSK constellation dots of FIG. 5 can be induced by Eq. (7) below using the property of Eq. (4).

$$LLR[b0] = \left\{\max\begin{pmatrix} P_0, P_1, P_2, P_3, P_4, P_5, P_6, P_7, \\ P_8, P_9, P_{10}, P_{11}, P_{12}, P_{13}, P_{14}, P_{15} \end{pmatrix} - \max\begin{pmatrix} P_{16}, P_{17}, P_{18}, P_{19}, P_{20}, P_{21}, P_{22}, P_{23}, \\ P_{24}, P_{25}, P_{26}, P_{27}, P_{28}, P_{29}, P_{30}, P_{31} \end{pmatrix}\right\}$$

$$LLR[b1] = \left\{\max\begin{pmatrix} P_0, P_1, P_2, P_3, P_4, P_5, P_6, P_7, \\ P_{16}, P_{17}, P_{18}, P_{19}, P_{20}, P_{21}, P_{22}, P_{23} \end{pmatrix} - \max\begin{pmatrix} P_8, P_9, P_{10}, P_{11}, P_{12}, P_{13}, P_{14}, P_{15}, \\ P_{24}, P_{25}, P_{26}, P_{27}, P_{28}, P_{29}, P_{30}, P_{31} \end{pmatrix}\right\}$$

$$LLR[b2] = \left\{\max\begin{pmatrix} P_0, P_1, P_2, P_3, P_8, P_9, P_{10}, P_{11}, \\ P_{16}, P_{17}, P_{18}, P_{19}, P_{24}, P_{25}, P_{26}, P_{27} \end{pmatrix} - \max\begin{pmatrix} P_4, P_5, P_6, P_7, P_{12}, P_{13}, P_{14}, P_{15}, \\ P_{20}, P_{21}, P_{22}, P_{23}, P_{28}, P_{29}, P_{30}, P_{31} \end{pmatrix}\right\}$$

$$LLR[b3] = \left\{\max\begin{pmatrix} P_0, P_1, P_4, P_5, P_8, P_9, P_{12}, P_{13}, \\ P_{16}, P_{17}, P_{20}, P_{21}, P_{24}, P_{25}, P_{26}, P_{29} \end{pmatrix} - \max\begin{pmatrix} P_2, P_3, P_6, P_7, P_{10}, P_{11}, P_{14}, P_{15}, \\ P_{18}, P_{19}, P_{22}, P_{23}, P_{26}, P_{27}, P_{30}, P_{31} \end{pmatrix}\right\}$$

$$LLR[b4] = \left\{\max\begin{pmatrix} P_0, P_2, P_4, P_6, P_8, P_{10}, P_{12}, P_{14}, \\ P_{16}, P_{18}, P_{20}, P_{22}, P_{24}, P_{26}, P_{28}, P_{30} \end{pmatrix} - \max\begin{pmatrix} P_1, P_3, P_5, P_7, P_9, P_{11}, P_{13}, P_{15}, \\ P_{17}, P_{19}, P_{21}, P_{23}, P_{25}, P_{27}, P_{29}, P_{31} \end{pmatrix}\right\}$$

Eq. (7)

$$\text{where, } P_i = \frac{-\|r - s_i\|^2}{2\sigma^2} \text{ where, } i = 0, \ldots, 31$$

wherein "r" is a received symbol, "$S_i$" is constellation dots (coordinates of constellation dots), and "$\sigma^2$" indicates a variance in an AWGN channel environment.

In other words, $P_i$ means distance values between the received signal r and the coordinates $S_i$ of constellation dots; and in case of 8 PSK, $P_0$ denotes "00000", $P_1$ "00001", $P_2$ "00010", $P_3$ "00011", $P_4$ "00100", $P_5$ "00101", $P_6$ "00110", $P_7$ "00111", $P_8$ "01000", $P_9$ "01001", $P_{10}$ "01010", $P_{11}$ "01011", $P_{12}$ "01100", $P_{13}$ "01101", $P_{14}$ "01110", $P_{15}$ "01111", ..., $P_{30}$ "11110", and $P_{31}$ "11111".

Further, "b0, b1, b2, b3 and b4" indicate bits upon symbol mapping at 32 APSK constellation dots of FIG. 5, and "LLR[b0], LLR[b1], LLR[b2], LLR[b3] and LLR[b4]" are outputs of soft decision method as probability values of each of b0, b1, b2, b3 and b4 bits.

Therefore, in the 32 APSK, LLR[b0] is a soft decision value of a first bit, LLR[b1] is a soft decision value of a second bit, LLR[b2] is a soft decision value of a third bit, LLR[b3] is a soft decision value of a fourth bit, and LLR[b4] is a soft decision value of a fifth bit.

Accordingly, in case of soft-deciding a first bit of 5-bit received signal symbol (LLR[b0]), there is obtained a difference between a maximum value max ($P_0$, $P_1$, $P_2$, $P_3$, $P_4$, $P_5$, $P_6$, $P_7$, $P_8$, $P_9$, $P_{10}$, $P_{11}$, $P_{12}$, $P_{13}$, $P_{14}$, $P_{15}$) of distance values $P_i$ when the first bit is 0 and a maximum value max ($P_{16}$, $P_{17}$, $P_{18}$, $P_{19}$, $P_{20}$, $P_{21}$, $P_{22}$, $P_{23}$, $P_{24}$, $P_{25}$, $P_{26}$, $P_{27}$, $P_{28}$, $P_{29}$, $P_{30}$, $P_{31}$) of distance values when the first bit is 1.

In the Similar manner, it is possible to soft-decide a second to fifth bits of 5-bit received signal symbol (LLR[b1], LLR[b2], LLR[b3], LLR[b4].

Through such process, the exponent operation and log operation can be omitted in Eq. (7) above, and its implementation can be possible with only comparison operator, thereby decreasing complexity in actual hardware implementation. Thus, in the 32 PSK, soft decision values can be provided through 31 comparators, each having 2 inputs/1 output.

Figure 9:
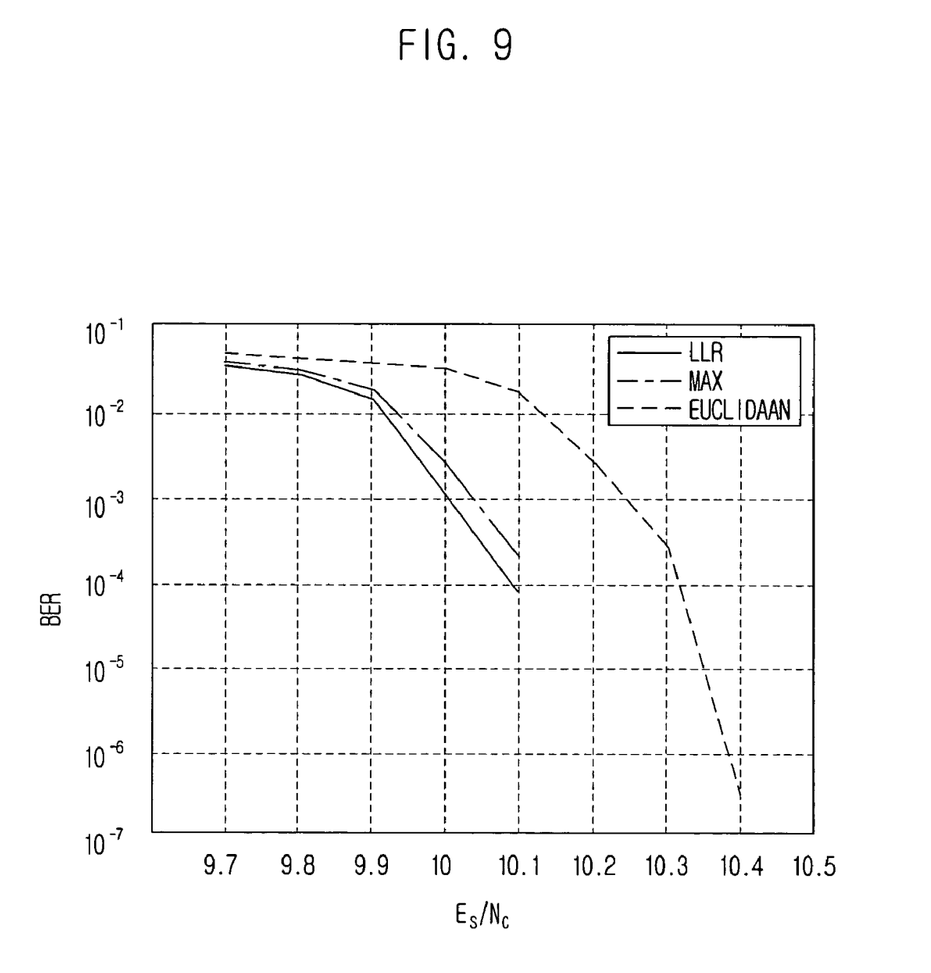
FIG. 9 is a graph showing BER performances when applying the 16 APSK modulation method in accordance with the present invention.
Figure 10:
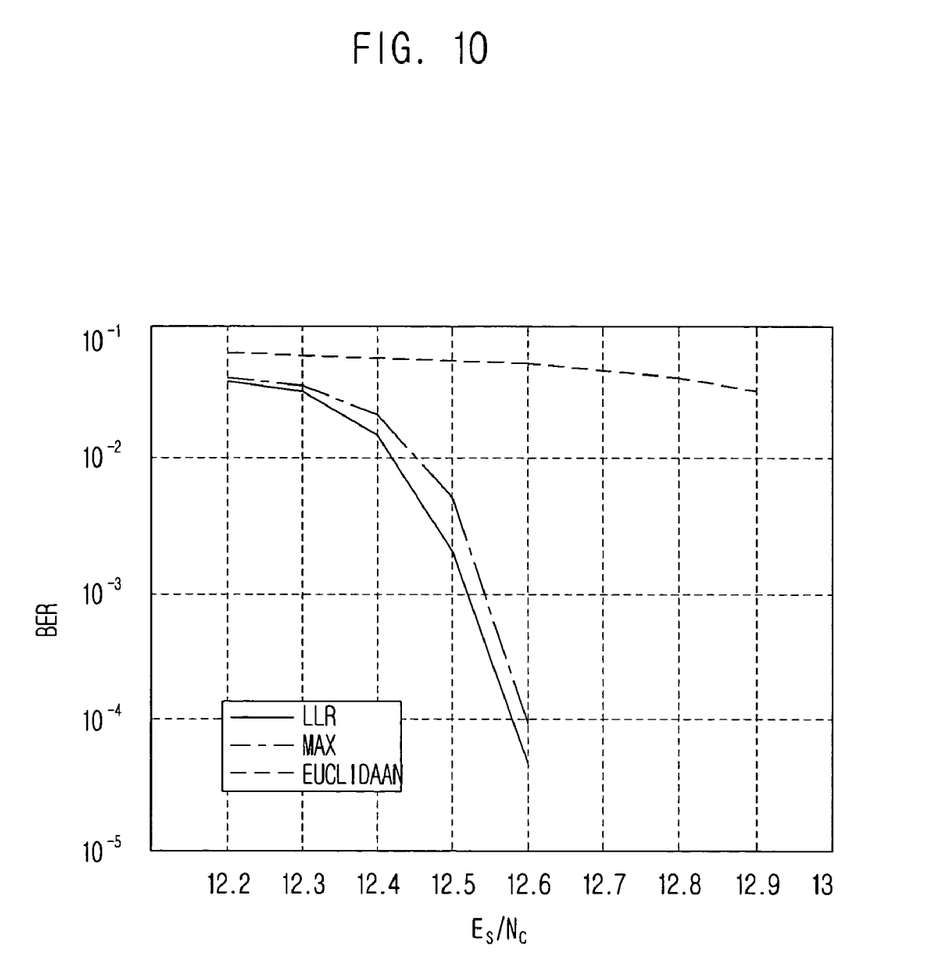
FIG. 10 is a graph showing BER performances when applying the 32 APSK modulation method in accordance with the present invention.

FIGS. 9 and 10 are graphs showing a comparison of BER performances of the conventional method (Euclidean) and the LLR of the present invention to which the 16 APSK and 32 APSK modulation methods are applied. At this time, the repetition code used is LDPC that is presented in the DVB-S2 standard, and a coding rate is ¾.

As can be seen from FIGS. 9 and 10, the LLR method of the present invention has no performance deterioration and is excellent in performance, compared to the existing method using Euclidian distance.

As mentioned above, it can be seen that the LLR method of the present invention has no performance deterioration also in the 16 APSK and 32 APSK, like the 8 PSK.

As a result, the present invention conducts a soft decision with no performance deterioration while reducing a size of hardware and an amount of power consumption due to incorporation of a repetition decoder of a digital wireless communication system. Therefore, the present invention has an advantage in that it can be efficiently applied between a repetition code (LPDC) decoder and a demodulator of a next satellite broadcasting system (DVB-S2) as a demapper.

The method of the present invention as mentioned above may be implemented by a software program and stored in a computer-readable storage medium such as CD-ROM, RAM, ROM, floppy disk, hard disk, optical magnetic disk, etc. This process may be readily carried out by those skilled in the art; and therefore, details of thereof are omitted here.

The present application contains subject matter related to Korean patent application No. 2005-0121114, filed with the Korean Intellectual Property Office on Dec. 9, 2005, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A soft decision demapping method suitable for higher-order modulation for an iterative decoder in a $2^N$ phase modulation system, N being a positive integer, said method being performed by an error correction apparatus and comprising the steps of:

defining, by a mean for defining of the error correction apparatus, distance values Pi between a received signal r and coordinates Si of constellation dots;

obtaining, by a mean for obtaining of the error correction apparatus, a difference between a maximum value of distance values Pi when a first bit or Most Significant Bit (MSB) is 0 and a maximum value of distance values Pi when the first bit is 1, during a soft decision of the first bit of N-bit received signal symbol;

acquiring, by a mean for acquiring of the error correction apparatus, a difference between a maximum value of distance values Pi when a second bit is 0 and a maximum value of distance values Pi when the second bit is 1, during a soft decision of the second bit of the N-bit received signal symbol; and deriving, by a mean for deriving of the error correction apparatus, a difference between a maximum value of distance values Pi when an Nth bit is 0 and a maximum value of distance values Pi when the Nth bit is 1, during a soft decision of the Nth bit of the N-bit received signal symbol.

2. The soft decision demapping method as recited in claim 1, wherein when said N is 3, a soft decision demapping method in an 8 Phase Shift Keying (PSK) modulation is implemented by a comparison operation as follows:

$$LLR[b2] = \log\frac{e^{P_0} + e^{P_1} + e^{P_2} + e^{P_3}}{e^{P_4} + e^{P_5} + e^{P_6} + e^{P_7}}$$
$$= \log(e^{P_0} + e^{P_1} + e^{P_2} + e^{P_3}) -$$
$$\log(e^{P_4} + e^{P_5} + e^{P_6} + e^{P_7})$$
$$\cong \{\max(P_0, P_1, P_2, P_3) - \max(P_4, P_5, P_6, P_7)\}$$

$$LLR[b1] = \log\frac{e^{P_0} + e^{P_1} + e^{P_4} + e^{P_5}}{e^{P_2} + e^{P_3} + e^{P_6} + e^{P_7}}$$
$$= \log(e^{P_0} + e^{P_1} + e^{P_4} + e^{P_5}) -$$
$$\log(e^{P_2} + e^{P_3} + e^{P_6} + e^{P_7})$$
$$\cong \{\max(P_0, P_1, P_4, P_5) - \max(P_2, P_3, P_6, P_7)\}$$

$$LLR[b0] = \log\frac{e^{P_0} + e^{P_2} + e^{P_4} + e^{P_6}}{e^{P_1} + e^{P_3} + e^{P_5} + e^{P_7}}$$
$$= \log(e^{P_0} + e^{P_2} + e^{P_4} + e^{P_6}) -$$
$$\log(e^{P_1} + e^{P_3} + e^{P_5} + e^{P_7})$$
$$\cong \{\max(P_0, P_2, P_4, P_6) - \max(P_1, P_3, P_5, P_7)\}$$

where, $P_i = \frac{-\|r - s_i\|^2}{2\sigma^2}$ $i = 0, \ldots, 7$ where "r" is a received symbol, "$S_i$" is constellation dots (coordinates of constellation dots), "$\sigma^2$" indicates a variance in an Additive White Gaussian Noise (AWGN) channel environment, "b0, b1 and b2" indicate bits upon symbol mapping at 8 PSK constellation dots, and "Log Likelihood Ratio (LLR)[b0], LLR[b1] and LLR[b2]" are outputs of soft decision method as probability values of each of b0, b1 and b2 bits, said LLR[b2] being a soft decision value of a first bit, said LLR[b1] being a soft decision value of a second bit and LLR[b0] being a soft decision value of a third bit.

3. The soft decision demapping method as recited in claim 1, wherein when said N is 4, a soft decision demapping method in a 16 Amplitude PSK (APSK) modulation is implemented by a comparison operation as:

$$LLR[b3] = \{\max(P_0, P_1, P_2, P_3, P_4, P_5, P_6, P_7) -$$
$$\max(P_8, P_9, P_{10}, P_{11}, P_{12}, P_{13}, P_{14}, P_{15})\}$$
$$LLR[b2] = \{\max(P_0, P_1, P_2, P_3, P_8, P_9, P_{10}, P_{11}) -$$
$$\max(P_4, P_5, P_6, P_7, P_{12}, P_{13}, P_{14}, P_{15})\}$$
$$LLR[b1] = \{\max(P_0, P_1, P_4, P_5, P_8, P_9, P_{12}, P_{13}) -$$
$$\max(P_2, P_3, P_6, P_7, P_{10}, P_{11}, P_{14}, P_{15})\}$$
$$LLR[b0] = \{\max(P_0, P_2, P_4, P_6, P_8, P_{10}, P_{12}, P_{14}) -$$
$$\max(P_1, P_3, P_5, P_7, P_9, P_{11}, P_{13}, P_{15})\}$$

where, $P_i = \frac{-\|r - s_i\|^2}{2\sigma^2}$ where, $i = 0, \ldots, 15$ where "r" is a received symbol, "$S_i$" is constellation dots (coordinates of constellation dots), "$\sigma^2$" indicates a variance in an AWGN channel environment, "b0, b1, b2 and b3" indicate bits upon symbol mapping at 16 APSK constellation dots, and "LLR[b0], LLR[b1], LLR[b2] and LLR[b3]" are outputs of soft decision method as probability values of each of b0, b1, b2 and b3 bits, said LLR[b3] being a soft decision value of a first bit, said LLR[b2] being a soft decision value of a second bit, said LLR[b1] being a soft decision value of a third bit and said LLR[b0] being a soft decision value of a fourth bit.

4. The soft decision demapping method as recited in claim 1, wherein when said N is 5, a soft decision demapping method in a 32 APSK modulation is implemented by a comparison operation as:

$$LLR[b0] = \left\{ \max\begin{pmatrix} P_0, P_1, P_2, P_3, P_4, P_5, P_6, P_7, \\ P_8, P_9, P_{10}, P_{11}, P_{12}, P_{13}, P_{14}, P_{15} \end{pmatrix} - \right.$$
$$\left. \max\begin{pmatrix} P_{16}, P_{17}, P_{18}, P_{19}, P_{20}, P_{21}, P_{22}, P_{23}, \\ P_{24}, P_{25}, P_{26}, P_{27}, P_{28}, P_{29}, P_{30}, P_{31} \end{pmatrix} \right\}$$

$$LLR[b1] = \left\{ \max\begin{pmatrix} P_0, P_1, P_2, P_3, P_4, P_5, P_6, P_7, \\ P_{16}, P_{17}, P_{18}, P_{19}, P_{20}, P_{21}, P_{22}, P_{23} \end{pmatrix} - \right.$$
$$\left. \max\begin{pmatrix} P_8, P_9, P_{10}, P_{11}, P_{12}, P_{13}, P_{14}, P_{15}, \\ P_{24}, P_{25}, P_{26}, P_{27}, P_{28}, P_{29}, P_{30}, P_{31} \end{pmatrix} \right\}$$

$$LLR[b2] = \left\{ \max\begin{pmatrix} P_0, P_1, P_2, P_3, P_8, P_9, P_{10}, P_{11}, \\ P_{16}, P_{17}, P_{18}, P_{19}, P_{24}, P_{25}, P_{26}, P_{27} \end{pmatrix} - \right.$$
$$\left. \max\begin{pmatrix} P_4, P_5, P_6, P_7, P_{12}, P_{13}, P_{14}, P_{15}, \\ P_{20}, P_{21}, P_{22}, P_{23}, P_{28}, P_{29}, P_{30}, P_{31} \end{pmatrix} \right\}$$

$$LLR[b3] = \left\{ \max\begin{pmatrix} P_0, P_1, P_4, P_5, P_8, P_9, P_{12}, P_{13}, \\ P_{16}, P_{17}, P_{20}, P_{21}, P_{24}, P_{25}, P_{26}, P_{29} \end{pmatrix} - \right.$$
$$\left. \max\begin{pmatrix} P_2, P_3, P_6, P_7, P_{10}, P_{11}, P_{14}, P_{15}, \\ P_{18}, P_{19}, P_{22}, P_{23}, P_{26}, P_{27}, P_{30}, P_{31} \end{pmatrix} \right\}$$

$$LLR[b4] = \left\{ \max\begin{pmatrix} P_0, P_2, P_4, P_6, P_8, P_{10}, P_{12}, P_{14}, \\ P_{16}, P_{18}, P_{20}, P_{22}, P_{24}, P_{26}, P_{28}, P_{30} \end{pmatrix} - \right.$$
$$\left. \max\begin{pmatrix} P_1, P_3, P_5, P_7, P_9, P_{11}, P_{13}, P_{15}, \\ P_{17}, P_{19}, P_{21}, P_{23}, P_{25}, P_{27}, P_{29}, P_{31} \end{pmatrix} \right\}$$

where, $P_i = \dfrac{-\|r - s_i\|^2}{2\sigma^2}$ where, $i = 0, \ldots, 31$ where "r" is a received symbol, "$S_i$" is constellation dots (coordinates of constellation dots), "$\sigma^2$" indicates a variance in an AWGN channel environment, "b0, b1, b2, b3 and b4" indicate bits upon symbol mapping at 32 APSK constellation dots, and "LLR[b0], LLR[b1], LLR[b2], LLR[b3] and LLR[b4]" are outputs of soft decision method as probability values of each of b0, b1, b2, b3 and b4 bits, said LLR[b0] being a soft decision value of a first bit, said LLR[b1] being a soft decision value of a second bit, said LLR[b2] being a soft decision value of a third bit, said LLR[b3] being a soft decision value of a fourth bit and said LLR[b4] being a soft decision value of a fifth bit.

5. An error correction apparatus for correcting errors of values obtained by soft-decision of a received symbol as bits by using a soft decision demapping method, said error correction apparatus comprising:

a means for defining distance values Pi between a received signal r and coordinates Si of constellation dots;

a means for obtaining a difference between a maximum value of distance values Pi when a first bit or Most Significant Bit (MSB) is 0 and a maximum value of distance values Pi when the first bit is 1, during a soft decision of the first bit of N-bit received signal symbol;

a means for acquiring a difference between a maximum value of distance values Pi when a second bit is 0 and a maximum value of distance values Pi when the second bit is 1, during a soft decision of the second bit of the N-bit received signal symbol; and a means for deriving a difference between a maximum value of distance values Pi when an Nth bit is 0 and a maximum value of distance values Pi when the Nth bit is 1, during a soft decision of the Nth bit of the N-bit received signal symbol.

6. The error correction apparatus as recited in claim 5, wherein when said N is 3, a soft decision demapping in an 8 Phase Shift Keying (PSK) modulation is implemented by a comparison operation as follows:

$$LLR[b2] = \log\frac{e^{P_0} + e^{P_1} + e^{P_2} + e^{P_3}}{e^{P_4} + e^{P_5} + e^{P_6} + e^{P_7}}$$
$$= \log(e^{P_0} + e^{P_1} + e^{P_2} + e^{P_3}) -$$
$$\log(e^{P_4} + e^{P_5} + e^{P_6} + e^{P_7})$$
$$\cong \{\max(P_0, P_1, P_2, P_3) - \max(P_4, P_5, P_6, P_7)\}$$

$$LLR[b1] = \log\frac{e^{P_0} + e^{P_1} + e^{P_4} + e^{P_5}}{e^{P_2} + e^{P_3} + e^{P_6} + e^{P_7}}$$
$$= \log(e^{P_0} + e^{P_1} + e^{P_4} + e^{P_5}) -$$
$$\log(e^{P_2} + e^{P_3} + e^{P_6} + e^{P_7})$$
$$\cong \{\max(P_0, P_1, P_4, P_5) - \max(P_2, P_3, P_6, P_7)\}$$

$$LLR[b0] = \log\frac{e^{P_0} + e^{P_2} + e^{P_4} + e^{P_6}}{e^{P_1} + e^{P_3} + e^{P_5} + e^{P_7}}$$
$$= \log(e^{P_0} + e^{P_2} + e^{P_4} + e^{P_6}) -$$
$$\log(e^{P_1} + e^{P_3} + e^{P_5} + e^{P_7})$$
$$\cong \{\max(P_0, P_2, P_4, P_6) - \max(P_1, P_3, P_5, P_7)\}$$

where, $P_i = \dfrac{-\|r - s_i\|^2}{2\sigma^2}$ $i = 0, \ldots, 7$ where "r" is a received symbol, "$S_i$" is constellation dots (coordinates of constellation dots), "$\sigma^2$" indicates a variance in an Additive White Gaussian Noise (AWGN) channel environment, "b0, b1 and b2" indicate bits upon symbol mapping at 8 PSK constellation dots, and "Log Likelihood Ratio (LLR)[b0], LLR[b1] and LLR[b2]" are outputs of soft decision method as probability values of each of b0, b1 and b2 bits, said LLR[b2] being a soft decision value of a first bit, said LLR[b1] being a soft decision value of a second bit and LLR[b0] being a soft decision value of a third bit.

7. The error correction apparatus as recited in claim 5, wherein when said N is 4, a soft decision demapping in a 16 Amplitude PSK (APSK) modulation is implemented by a comparison operation as:

$$LLR[b3] = \{\max(P_0, P_1, P_2, P_3, P_4, P_5, P_6, P_7) -$$
$$\max(P_8, P_9, P_{10}, P_{11}, P_{12}, P_{13}, P_{14}, P_{15})\}$$

$$LLR[b2] = \{\max(P_0, P_1, P_2, P_3, P_8, P_9, P_{10}, P_{11}) -$$
$$\max(P_4, P_5, P_6, P_7, P_{12}, P_{13}, P_{14}, P_{15})\}$$

$$LLR[b1] = \{\max(P_0, P_1, P_4, P_5, P_8, P_9, P_{12}, P_{13}) -$$
$$\max(P_2, P_3, P_6, P_7, P_{10}, P_{11}, P_{14}, P_{15})\}$$

$$LLR[b0] = \{\max(P_0, P_2, P_4, P_6, P_8, P_{10}, P_{12}, P_{14}) -$$
$$\max(P_1, P_3, P_5, P_7, P_9, P_{11}, P_{13}, P_{15})\}$$

where, $P_i = \dfrac{-\|r - s_i\|^2}{2\sigma^2}$ where, $i = 0, \ldots, 15$ where "r" is a received symbol, "$S_i$" is constellation dots (coordinates of constellation dots), "$\sigma^2$" indicates a variance in an AWGN channel environment, "b0, b1, b2 and b3" indicate bits upon symbol mapping at 16 APSK constellation dots, and "LLR[b0], LLR[b1], LLR[b2] and LLR[b3]" are outputs of soft decision method as probability values of each of b0, b1, b2 and b3 bits, said LLR[b3] being a soft decision value of a first bit, said LLR[b2] being a soft decision value of a second bit, said LLR[b1] being a soft decision value of a third bit and said LLR[b0] being a soft decision value of a fourth bit.

8. The error correction apparatus as recited in claim 5, wherein when said N is 5, a soft decision demapping in a 32 APSK modulation is implemented by a comparison operation as: .

$$LLR[b0] = \{\max(P_0, P_1, P_2, P_3, P_4, P_5, P_6, P_7, P_8, P_9, P_{10}, P_{11}, P_{12}, P_{13}, P_{14}, P_{15}) -$$
$$\max(P_{16}, P_{17}, P_{18}, P_{19}, P_{20}, P_{21}, P_{22}, P_{23}, P_{24}, P_{25}, P_{26}, P_{27}, P_{28}, P_{29}, P_{30}, P_{31})\}$$
$$LLR[b1] = \{\max(P_0, P_1, P_2, P_3, P_4, P_5, P_6, P_7, P_{16}, P_{17}, P_{18}, P_{19}, P_{20}, P_{21}, P_{22}, P_{23}) -$$
$$\max(P_8, P_9, P_{10}, P_{11}, P_{12}, P_{13}, P_{14}, P_{15}, P_{24}, P_{25}, P_{26}, P_{27}, P_{28}, P_{29}, P_{30}, P_{31})\}$$
$$LLR[b2] = \{\max(P_0, P_1, P_2, P_3, P_8, P_9, P_{10}, P_{11}, P_{16}, P_{17}, P_{18}, P_{19}, P_{24}, P_{25}, P_{26}, P_{27}) -$$
$$\max(P_4, P_5, P_6, P_7, P_{12}, P_{13}, P_{14}, P_{15}, P_{20}, P_{21}, P_{22}, P_{23}, P_{28}, P_{29}, P_{30}, P_{31})\}$$
$$LLR[b3] = \{\max(P_0, P_1, P_4, P_5, P_8, P_0, P_{12}, P_{13}, P_{16}, P_{17}, P_{20}, P_{21}, P_{24}, P_{25}, P_{28}, P_{29}) -$$
$$\max(P_2, P_3, P_6, P_7, P_{10}, P_{11}, P_{12}, P_{13}, P_{18}, P_{19}, P_{22}, P_{23}, P_{26}, P_{27}, P_{30}, P_{31})\}$$
$$LLR[b4] = \{\max(P_0, P_2, P_4, P_6, P_8, P_{10}, P_{12}, P_{14}, P_{16}, P_{18}, P_{20}, P_{22}, P_{24}, P_{26}, P_{28}, P_{30}) -$$
$$\max(P_1, P_3, P_5, P_7, P_9, P_{11}, P_{13}, P_{15}, P_{17}, P_{19}, P_{21}, P_{23}, P_{25}, P_{27}, P_{29}, P_{31})\}$$

where, $P_i = \dfrac{\|r - s_i\|^2}{2\sigma^2}$ where, $i = 0, \ldots, 31$ where "r" is a received symbol, "$S_i$" is constellation dots (coordinates of constellation dots), "$\sigma^2$" indicates a variance in an AWGN channel environment, "b0, b1, b2, b3 and b4" indicate bits upon symbol mapping at 32 APSK constellation dots, and "LLR[b0], LLR[b1], LLR[b2], LLR[b3] and LLR[b4]" are outputs of soft decision method as probability values of each of b0, b1, b2, b3 and b4 bits, said LLR[b0] being a soft decision value of a first bit, said LLR[b1] being a soft decision value of a second bit, said LLR[b2] being a soft decision value of a third bit, said LLR[b3] being a soft decision value of a fourth bit and said LLR[b4] being a soft decision value of a fifth bit.

9. The error correction apparatus as recited in claim 5, wherein if a channel code is a repetition code, the apparatus receives a value, from a soft decision demapper, in which bits by order of higher-order modulation are divided as soft decision, and corrects errors based on an adaptation demodulation signal and modulation method information to have performance that approaches Shannon limit.

\* \* \* \* \*